US008818357B2

(12) United States Patent
Jacob et al.

(10) Patent No.: US 8,818,357 B2
(45) Date of Patent: Aug. 26, 2014

(54) METHOD FOR THE DIAGNOSTIC TESTING OF A MOBILE TELEPHONE TERMINAL INCLUDING CONTACTLESS APPLICATIONS

(75) Inventors: Antoine Jacob, Versailles (FR); Charles-Emile Grondin, Epinay sur Seine (FR); Pierre Le Pallec, Voisins le Bretonneux (FR)

(73) Assignee: Bouygues Telecom, Paris (FR)

( * ) Notice: Subject to any disclaimer, the term of this patent is extended or adjusted under 35 U.S.C. 154(b) by 522 days.

(21) Appl. No.: 12/990,205

(22) PCT Filed: Apr. 24, 2009

(86) PCT No.: PCT/EP2009/054953
§ 371 (c)(1),
(2), (4) Date: Jan. 10, 2011

(87) PCT Pub. No.: WO2009/133029
PCT Pub. Date: Nov. 5, 2009

(65) Prior Publication Data
US 2011/0111750 A1     May 12, 2011

(30) Foreign Application Priority Data
Apr. 30, 2008   (FR) ...................................... 08 52944

(51) Int. Cl.
*H04W 24/00*       (2009.01)
*H04B 1/38*        (2006.01)

(52) U.S. Cl.
USPC ........ 455/423; 455/41.1; 455/414.1; 455/558

(58) Field of Classification Search
USPC ............... 455/423–425, 41.1, 41.2, 558, 418, 455/414.1, 115.1; 702/115–123, 183–185
See application file for complete search history.

(56) References Cited

U.S. PATENT DOCUMENTS

| 6,466,007 | B1 * | 10/2002 | Prazeres da Costa et al. ........................ 324/762.02 |
| 6,466,804 | B1 * | 10/2002 | Pecen et al. ................... 455/558 |
| 6,687,499 | B1 * | 2/2004 | Numminen et al. .......... 455/423 |
| 2003/0032408 | A1 * | 2/2003 | Jennings ....................... 455/412 |
| 2003/0176182 | A1 * | 9/2003 | Cerami et al. ............. 455/414.1 |
| 2004/0058652 | A1 * | 3/2004 | McGregor et al. ......... 455/67.13 |

(Continued)

FOREIGN PATENT DOCUMENTS

| GB | 2 421 401 A | 6/2006 |
| GB | 2 427 328 A | 12/2006 |

(Continued)

OTHER PUBLICATIONS

GlobalPlatform Card Specification Version 2.1.1, dated Mar. 2003.*

*Primary Examiner* — Daniel Lai
(74) *Attorney, Agent, or Firm* — Blakely Sokoloff Taylor & Zafman

(57) ABSTRACT

The invention relates to a method for the diagnostic testing of a mobile telephone terminal (10) including: a UICC card (13) containing a stored test application, and a contactless communication module (12) which can exchange data with a contactless unit (20) by retromodulation of a signal transmitted by the unit, said method comprising a test operation whereby the unit: emits a test application selection request; detects a response indicating application selection confirmation or failure, transmitted by the mobile telephone terminal; and determines the operating state of the UICC card or of the terminal as a function of the response detected.

13 Claims, 3 Drawing Sheets

(56) References Cited

U.S. PATENT DOCUMENTS

| | | | |
|---|---|---|---|
| 2004/0160233 A1* | 8/2004 | Forster | 324/667 |
| 2005/0155031 A1* | 7/2005 | Wang et al. | 717/170 |
| 2006/0276989 A1* | 12/2006 | Ludwig et al. | 702/122 |
| 2008/0064346 A1* | 3/2008 | Charrat | 455/131 |
| 2008/0081608 A1 | 4/2008 | Findikli et al. | |
| 2010/0093396 A1* | 4/2010 | Roundtree | 455/558 |

FOREIGN PATENT DOCUMENTS

| | | |
|---|---|---|
| WO | WO 02/51183 A1 | 6/2002 |
| WO | WO 2004/012352 A1 | 2/2004 |
| WO | WO 2006/137740 A1 | 12/2006 |
| WO | WO 2007/132282 A1 | 11/2007 |

* cited by examiner

METHOD FOR THE DIAGNOSTIC TESTING OF A MOBILE TELEPHONE TERMINAL INCLUDING CONTACTLESS APPLICATIONS

This is a non-provisional application claiming the benefit of International application number PCT/EP2009/054953 filed Apr. 24, 2009.

FIELD OF INVENTION

The invention concerns a method for the diagnostic testing of a mobile telephone terminal including one or several contactless applications. The invention also concerns an associated contactless unit, and an associated mobile telephone terminal.

BACKGROUND OF THE INVENTION

More and more services use wireless communication techniques. These techniques allow devices to exchange data with each other or with a contactless chip card, via a short range radiofrequency connection (typically in the vicinity of a few centimeters in the framework of the ISO 14443 standard) or a proximity radiofrequency connection (in the vicinity of a meter in the framework of the ISO 15693 standard).

"Contactless" describes an exchange of data between a contactless reader (Proximity Coupling Device—PCD) and a contactless card (Proximity Integrated Circuit Card—PICC), in which the reader transmits a wireless signal on a predetermined carrier frequency and the card transmits another signal by retromodulation of the carrier frequency.

The card can be "passive", in which case it is powered by the wireless field transmitted by the reader (by charge modulation through inductive coupling), or "active", in which case it includes a specific power source.

Certain mobile terminals (mobile telephones or PDAs) include contactless applications allowing users to use their mobile terminal as an information medium able to exchange data, the terminal thus being able to act as payment card, loyalty card, badge, show ticket, transportation ticket or key, for example. These applications can be stored in the terminal's UICC (Universal Integrated Circuit Card).

With the multiplication of services using this data transfer method, a same mobile terminal must be able to implement several contactless applications, each application being able to be used in the context of a specific service procured by a supplier or service provider. The different applications are not necessarily associated with the same supplier or service provider. Moreover, the service provider is not necessarily the mobile telephone operator. For example, a payment application may be used by a user who subscribes for a contactless payment service offered by a bank.

When the user encounters problems in accessing a given service, he may address the mobile telephone operator's customer service.

However, the problems encountered may have different causes:

In a first case, the inability to access the service may result from a malfunction of the contactless components of the mobile telephone or the UICC card containing the stored application.

In a second case, the inability to access the service may result from a malfunction in the application.

In the first case, the mobile telephone operator must resolve the encountered problems, for example by replacing the mobile terminal or the UICC card. In the second case, it is the service supplier that must ensure the proper operation of the contactless application.

However, it is sometimes difficult to identify the causes of the malfunctions to orient the user towards the appropriate representative (the mobile telephone operator or the service supplier).

To try to identify the causes of the malfunctions, it is generally necessary to remove the UICC card from the mobile terminal and perform operating tests.

Moreover, it is not currently possible to test the other components of the mobile terminal.

BRIEF DESCRIPTION OF THE INVENTION

One aim of the invention is to allow rapid and simple identification of the causes of a malfunction.

This problem is resolved in the context of the present invention owing to a method for the diagnostic testing of a mobile telephone terminal including a UICC card containing a stored test application and a contactless communication module which can exchange data with a contactless unit by retromodulation of a signal transmitted by the unit, comprising a test operation whereby the unit:

emits a test application selection request;

detects a response indicating application selection confirmation or failure, transmitted by the mobile telephone terminal; and determines the operating state of the UICC card or of the terminal as a function of the response detected.

The UICC card is programmed with a specific test application allowing the mobile terminal to respond to the unit during a test operation. The test operation thus makes it possible to verify that the chain of contactless components (communication module and UICC card) is operating correctly, without having to remove the UICC card.

The method can include steps according to which:

if the unit does not detect any response from the mobile terminal, the unit deduces a malfunction of the mobile terminal, if the unit detects an error response from the mobile terminal, the unit deduces a malfunction of the UICC card.

In one embodiment of the invention, the method comprises a prior test operation according to which the unit:

transmits an initialization request having a predetermined format, detects or does not detect a response transmitted by the mobile telephone terminal, deduces an operating state of the mobile terminal based on the detection or non-detection of the response.

The prior test operation makes it possible to verify that the mobile terminal works before performing the test operation on the chain of contactless components.

The prior test operation can be carried out as follows:

the unit transmits a plurality of successive initialization requests, each request having a format that varies according to a predetermined request format sequence, if the unit detects a response, then the unit carries out the steps of the following test operation in order to verify the operation of the chain of contactless components, if the unit does not detect a response, then the unit deduces a malfunction of the terminal.

In one embodiment of the invention, the method also comprises a subsequent test operation according to which the unit:
transmits a query command to the UICC card's directory,
determines whether a given application is present in the UICC card by looking for the application in a list of applications sent by the mobile terminal in response to the query command,
deduces an operating state of the application.

The subsequent test operation is carried out in the case where both of the preceding test operations have not made it possible to conclude on a malfunction of the terminal or of the chain of contactless components. The subsequent test operation makes it possible to verify that a given contactless application is indeed present in the UICC card.

The subsequent test operation can be carried out as follows:
if the unit determines that the given application is present, then the unit deduces a malfunction of the application.

In one embodiment of the invention, the unit queries a database to determine whether the mobile telephone user has subscribed to the service associated with the given application.

The invention also concerns a contactless unit for diagnostic testing of an operating state of a mobile telephone terminal including a UICC card containing a stored test application and a contactless communication module which can exchange data with the contactless unit by retromodulation of a signal transmitted by the unit, the unit being able to carry out one or several of the previously defined test operations.

The invention also concerns a mobile telephone terminal including a UICC card containing a stored test application and a contactless communication module which is able to exchange data with a contactless unit by retromodulation of a signal transmitted by the unit, the test application being programmed to carry out a test operation according to which, when the communication module receives a test application selection request transmitted by the unit, the communication module sends an application selection confirmation response back to the unit, such that the unit can determine an operating state of the UICC card as a function of the sent back response.

BRIEF DESCRIPTION OF THE DRAWINGS

Other features and advantages will emerge from the following description, which is purely for information and non-limiting, and which must be read in light of the appended figures, in which.

DETAILED DESCRIPTION OF THE INVENTION

Figure 1:
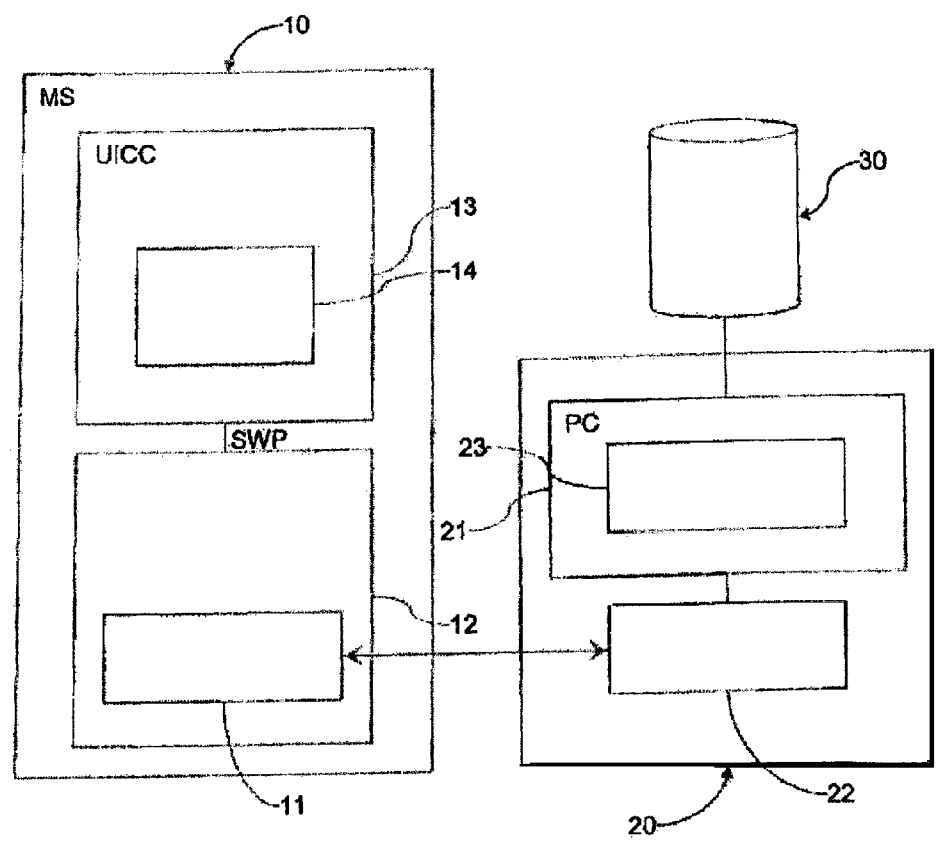
FIG. 1 diagrammatically illustrates a mobile telephone terminal including a contactless communication module and a diagnostic unit, FIG. 2 diagrammatically illustrates the steps of a first test operation according to one embodiment of the diagnostic method of the invention, FIG. 3 diagrammatically illustrates the steps of a second test operation according to one embodiment of the method according to the invention, FIG. 4 diagrammatically illustrates the steps of a third test operation according to one embodiment of the method according to the invention.

FIG. 1 diagrammatically shows a mobile telephone terminal 10 and a diagnostic unit 20.

The mobile telephone terminal 10 is a terminal able to establish telephone communications via a mobile telephone cellular network.

The mobile telephone terminal 10 is also adapted to exchange data with a contactless unit.

To that end, the terminal 10 comprises a contactless communication module 12 including a specific antenna 11, and a UICC card 13 in which one or several contactless applications are stored. The UICC card 13, which is for example a SIM card, in particular contains a test application 14.

The UICC card 13 is initially programmed with the test operation 14 during manufacture in the plant or is configured remotely. In the latter case, the application 14 is sent to the mobile terminal via the cellular telephone network (OTA—Over the Air—transmission) and is stored in the UICC card.

Traditionally, the communication module 12 is connected to the UICC card 13 using a single contact. The communication module 12 and the UICC card 13 can exchange data according to a SWP protocol (Single Wire Protocol) via the unique contact.

The diagnostic unit 20 comprises a computer 21 and an antenna 22 able to transmit radiofrequency signals intended for the mobile terminal 10. The computer 21 includes a reader 23 able to decode the signals received by the antenna 22. The computer 21 contains a diagnostic testing program making it possible to test the operation of the mobile terminal 10.

Lastly, the diagnostic unit 20 is connected to a database 30 of the mobile telephone operator. The database 30 contains data concerning the mobile telephone network's subscribers.

Figure 2:
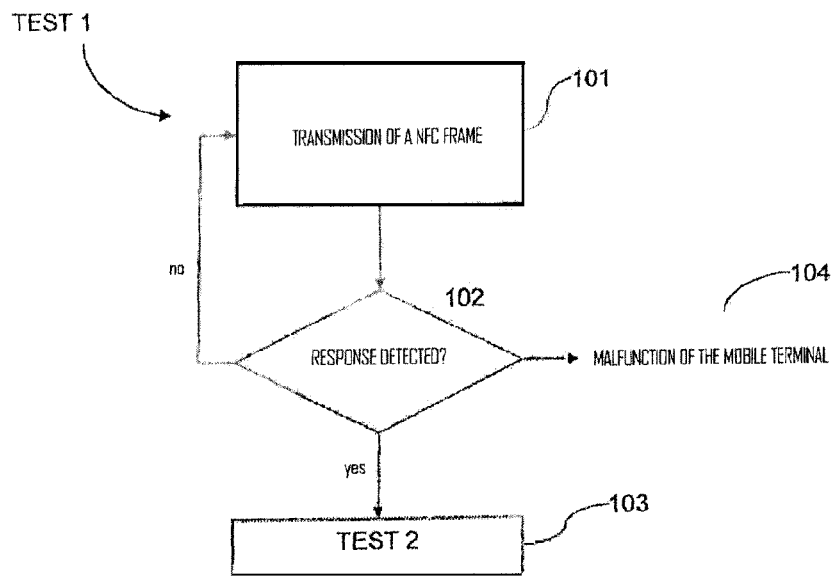
Figure 3:
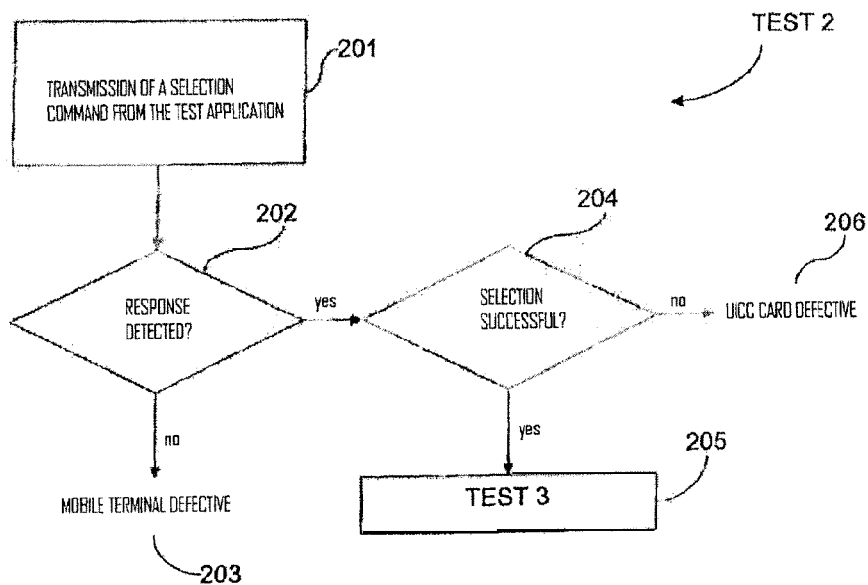
Figure 4:
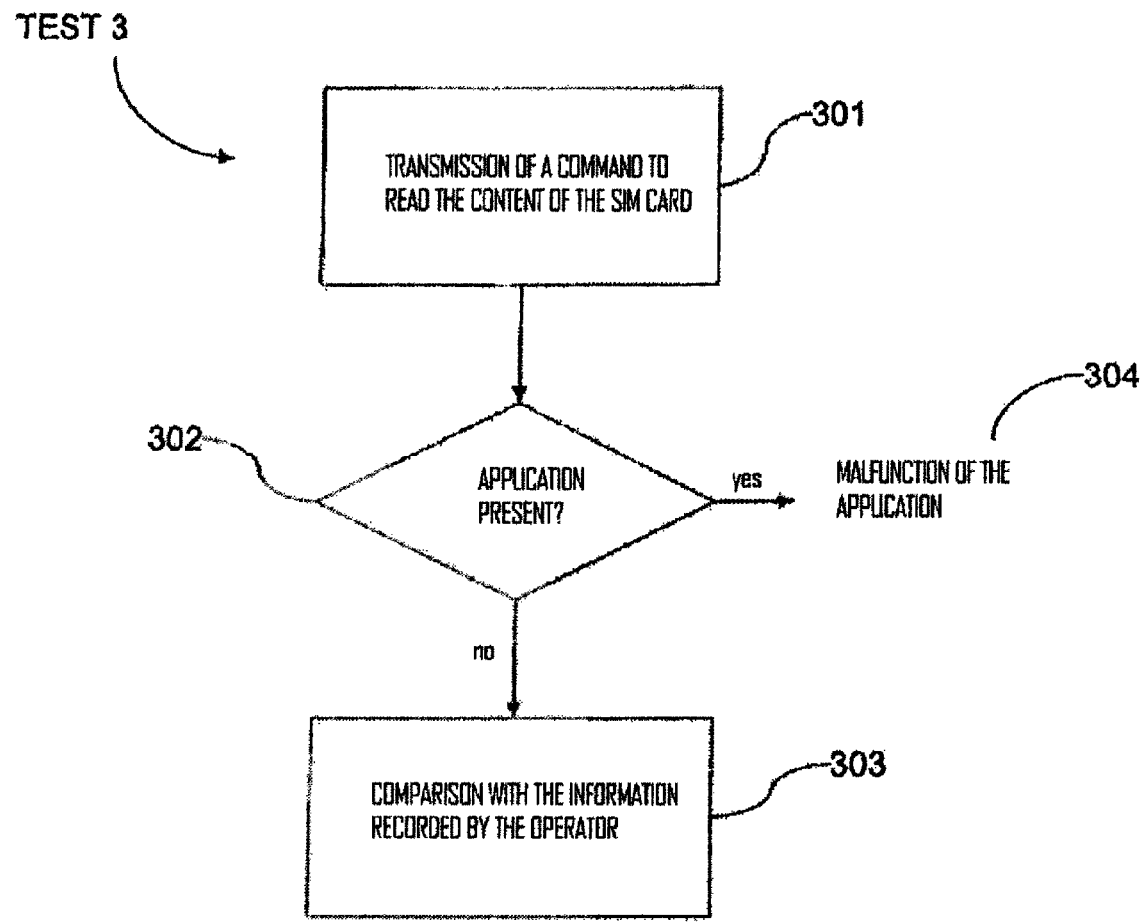

FIGS. 2 to 4 illustrate steps of a diagnostic testing method of a mobile telephone terminal according to one embodiment of the invention.

It is assumed that the mobile telephone terminal user addresses a customer service center to indicate that he is not managing to access a given service with his mobile terminal.

The diagnostic testing program can automatically carry out the different steps of the method. The diagnostic testing method takes place through three successive test operations.

A first test operation (TEST 1) is illustrated in FIG. 2.

According to a first step 101, the diagnostic testing program orders a transmission by the antenna of a radiofrequency signal in the form of an initialization command (REQUEST—REQ) according to a first predetermined communication protocol. The signal received by the antenna is sent to the contactless communication module. The communication module processes the signal and sends back a response (ANSWER TO REQUEST or ATQ).

According to a second step 102, the diagnostic testing program determines whether a response is sent by the terminal. The expected response consists of a response signal including an identifier (ID) of the contactless communication module. The response signal is generated by modulation of the NFC frame transmitted by the diagnostic terminal.

If a response is detected by the reader, then according to a third step 103, the diagnostic testing program triggers a second test operation (TEST 2).

If no response is detected by the reader, the diagnostic testing program again carries out the first step 101. This time, the terminal transmits a radiofrequency signal in the form of a NFC field according to a second predetermined communication protocol, different from the first protocol.

As long as no response is received from the mobile terminal, the diagnostic testing program renews step 101 by scanning a predetermined sequence of protocols. One example of a sequence is shown in table 1.

TABLE 1

| Protocol | Standard | Frequency | Interface (modulation and coding) |
|---|---|---|---|
| 1 | ISO 14443 | 13.56 MHz | Type A |
| 2 | ISO 14443 | 13.56 MHz | Type B |
| 3 | ISO 14443 | 13.56 MHz | Type B' Innovatron' |
| 4 | ISO 15693 | 13.56 MHz | |

According to a fourth step 104, when the entire sequence has been scanned by the diagnostic unit and no response has been received from the mobile terminal, the diagnostic unit concludes on a malfunction of the mobile terminal. In this case, the user's mobile terminal must be replaced.

The second test operation (TEST 2) is illustrated in FIG. 3.

According to a first step 201, the diagnostic testing program commands a transmission by the antenna of a radiofrequency signal in the form of a test application selection command (SELECT).

According to a second step 202, the diagnostic testing program determines whether a response is sent by the terminal. The expected response consists of a response signal including selection information (SELECT ACKNOWLEDGE or SAK).

If no response is detected by the reader, then according to the third step 203, the diagnostic unit concludes on a malfunction of the mobile terminal.

If a response is detected, then according to a fourth step 204, the diagnostic unit determines whether the selection was successful. In other words, the diagnostic testing program determines whether the reader detects a selection confirmation response or an error response.

If a selection confirmation response is detected by the reader, then according to a fifth step 205, the diagnostic testing program triggers a third test operation (TEST 3).

If an error response is detected, then according to a sixth step 206, the diagnostic unit concludes on a malfunction of the UICC card. In this case, the UICC card must be replaced.

The third test operation (TEST 3) is shown in FIG. 4.

According to a first step 301, the diagnostic testing program controls a transmission by the antenna of a radiofrequency signal in the form of a query command of the list of applications present on the UICC card (APDU Global Platform Command GET STATUS, the APDU Global Platform being query commands carried out in the application layer). In response to this command, the contactless communication module of the terminal returns a list of contactless applications present on the UICC card.

According to a second step 302, the diagnostic testing program determines whether a given application is present on the list.

If the application is absent, then according to a third step 303, the diagnostic unit queries the database so as to verify that the user has subscribed for the service associated with the missing application.

If the user has subscribed for the service, the user is asked to contact the service provider associated with the application.

In the contrary case, the diagnostic unit concludes that the user has not subscribed for the service associated with the application.

If the application is present, then according to a fourth step 304, the diagnostic testing program concludes on a malfunction of the application. In that case, the user is asked to contact the service provider associated with the defective application. Table 2 illustrates the possible results of the diagnostic testing method:

TABLE 2

| Test operation | Result of the test | | | |
|---|---|---|---|---|
| TEST 1 | No response detected | Response detected | | |
| TEST 2 | — | Selection failed | Selection successful | |
| TEST 3 | — | — | Application present | Application Absent |
| Diagnosis | Malfunction of the mobile terminal | Malfunction of the terminal or of the UICC card | Malfunction of the application | Service not available |

The invention claimed is:

1. A method for the diagnostic testing of a mobile telephone terminal including UICC card containing a stored test application and a contactless communication module which can exchange data with a contactless unit by retromodulation of a signal transmitted by the unit, comprising a test operation whereby the unit performs the steps:
    (101) transmitting an initialization request having a predetermined format,
    (102) detecting
        a response transmitted by the mobile telephone terminal, or
        an absence of response by the mobile telephone terminal,
        when the unit detects a response transmitted by the mobile telephone terminal;
    (201) emitting a test application selection request;
    (202, 204) detecting a response indicating application selection confirmation or failure, transmitted by the mobile telephone terminal;
    (203, 206) determining the operating state of the UICC card or of the terminal as a function of the response detected,
    (301) transmitting a query command to the UICC card's directory querying a list of applications present on the UICC card,
    (302) determining whether a given application is present in the UICC card by looking for the application in the list of applications,
    (304) deducing an operating state of the application, said deducing being based on the presence or absence of the application in the list of applications; and
    (104) when the unit does not detect a response, then the unit deduces a malfunction of the terminal.

2. The method according to claim 1, comprising a step according to which:
    (203) when the unit does not detect any response from the mobile terminal, the unit deduces a malfunction of the mobile terminal.

3. The method according to claim 1, comprising a step according to which:
    (206) when the unit detects an error response from the mobile terminal, the unit deduces a malfunction of the UICC card.

4. The method according to claim 1, in which:
    (101) the unit transmits a plurality of successive detection requests, each request having a format that varies according to a predetermined request format sequence.

5. The method according to claim 1, in which:
(304) when the unit determines that the given application is present, then the unit deduces a malfunction of the application.

6. The method according to claim 1, in which:
(303) the unit queries a database to determine whether the mobile telephone user has subscribed to the service associated with the given application.

7. A contactless unit (20) configured for diagnostic testing of an operating state of a mobile telephone terminal (10) including a UICC card (13) containing a stored test application and a contactless communication module (12) which can exchange data with the contactless unit (20) by retromodulation of a signal transmitted by the unit, the unit (20) being configured to carry out a test operation whereby the unit:
(101) transmits an initialization request having a predetermined format,
(102) detects
a response transmitted by the mobile telephone terminal, or an absence of response by the mobile telephone terminal, when the unit detects a response, then the unit:
(201) emits a test application selection request;
(202, 204) detects a response indicating application selection confirmation or failure, transmitted by the mobile telephone terminal;
(203, 206) determines the operating state of the UICC card or of the terminal as a function of the response detected,
the unit (20) being configured to carry out a subsequent step according to which the unit:
(301) transmits a query command to the UICC card's directory querying a list of applications present on the UICC card,
(302) determines whether a given application is present in the UICC card by looking for the application in the list of applications, and
(304) deduces an operating state of the application, said deduction being based on the presence or absence of the application in the list of applications; and
(104) when the unit does not detect a response, then the unit deduces a malfunction of the terminal.

8. The contactless unit of claim 7, wherein the unit (20) is configured to carry out a step according to which:
(203) when the unit does not detect any response from the mobile terminal, the unit deduces a malfunction of the mobile terminal.

9. The contactless unit of claim 7, wherein the unit (20) is configured to carry out a step according to which:
(206) when the unit detects an error response from the mobile terminal, the unit deduces a malfunction of the UICC card.

10. The contactless unit according to claim 7, wherein the unit (20) is configured to carry out a step according to which:
(101) the unit transmits a plurality of successive detection requests, each request having a format that varies according to a predetermined request format sequence.

11. The contactless unit according to claim 7, wherein the unit (20) is configured to carry out a step according to which:
(304) when the unit determines that the given application is present, then the unit deduces a malfunction of the application.

12. The contactless unit according to claim 7, wherein the unit (20) is configured to carry out a step according to which:
(303) the unit queries a database to determine whether the mobile telephone user has subscribed to the service associated with the given application.

13. A mobile telephone e terminal (10) including a UICC card (13) containing a stored test application and a contactless communication module (12) which is configured to exchange data with a contactless unit (20) by retromodulation of a signal transmitted by the unit (20), the test application being programmed to carry out a test operation according to which,
when the communication module receives an initialization request having a predetermined format by the unit, the communication module transmits a response such that the unit can determine an operating state of the terminal as a function of the sent back response,
an absence of response being associated with a malfunction of the terminal, and
when the sent back response is detected, the communication module receives a test application selection request transmitted by the unit, the communication module sends an application selection confirmation response back to the unit, such that the unit can determine an operating state of the UICC card as a function of the sent back response, and
when the communication module receives a query command to the UICC card's directory transmitted by the unit, querying a list of applications present on the UICC card,
the communication module sends a list of application back to the unit, and the unit deduces an operating state of the application, said deduction being based on the presence or absence of the application in the list of applications.

* * * * *